Figure 1:
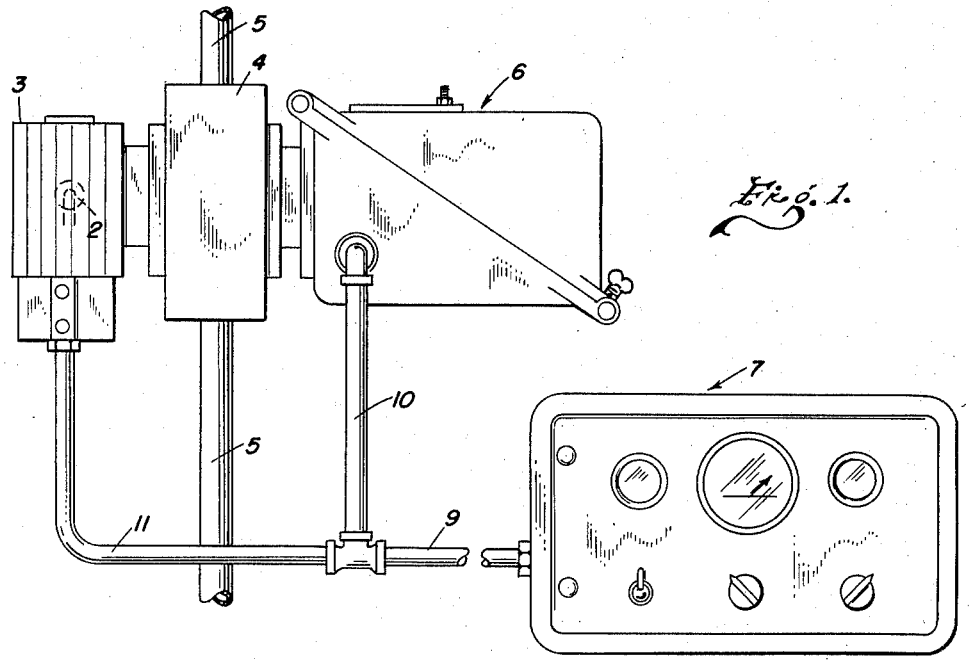

Oct. 21, 1958          M. KAYE          2,856,811

COLOR DEVIATION MEASURING INSTRUMENT

Filed Dec. 28, 1955          2 Sheets-Sheet 1

INVENTOR.
MORTON KAYE

BY John C. Blair
ATTORNEY.

Oct. 21, 1958        M. KAYE        2,856,811
COLOR DEVIATION MEASURING INSTRUMENT
Filed Dec. 28, 1955        2 Sheets-Sheet 2
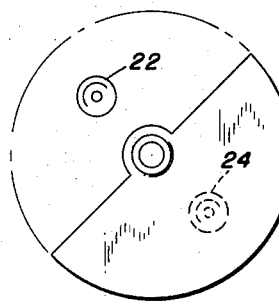
Fig. 3.
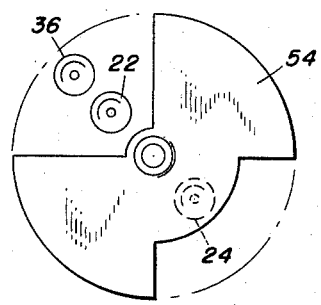
Fig. 4.
Fig. 5.
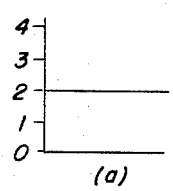 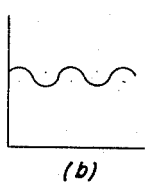 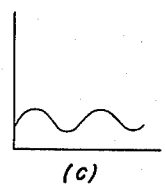
  (a)        (b)        (c)
Fig. 6.
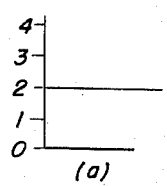 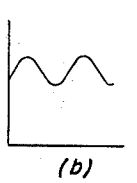 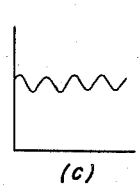 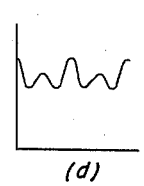
  (a)        (b)        (c)        (d)
INVENTOR.
MORTON KAYE
BY *John C. Blair*
ATTORNEY.

United States Patent Office 2,856,811
Patented Oct. 21, 1958

2,856,811

COLOR DEVIATION MEASURING INSTRUMENT

Morton Kaye, South Norwalk, Conn., assignor, by mesne assignments, to The Perkin-Elmer Corporation, Norwalk, Conn., a corporation of New York Application December 28, 1955, Serial No. 555,937

10 Claims. (Cl. 88—14)

This invention relates to improved color deviation measuring apparatus and to an improved method for measuring color deviation of a production sample from a standard sample. More particularly, it relates to a method and apparatus for measuring the color deviation of a sample wherein two or more color components are checked, in contrast to present systems wherein only one component is checked.

The measurement of color deviation is of importance in the manufacture of products such as paint where color itself is of primary importance and products such as tincture of iodine where the color is indicative of some other characteristic, i. e. concentration, presence of impurities, or correctness of the proportions of various ingredients. At present, color deviation is measured by coloring a beam of light from a light source by transmission through or reflection from a sample under test. This colored beam is then filtered to pass the color component of interest in the test. The intensity of the filtered beam is compared, generally by electronic means, with that of a beam emanating directly from the light source, and the result of the comparison is checked with that obtained from a similar comparison made with a standard sample.

The present method has two inherently serious limitations: it cannot differentiate a change in color from greying or dilution by a colorless substance, and, where more than one color component is of interest, a plurality of instruments must be used, which makes for a cumbersome and costly setup.

Accordingly, it is an object of this invention to provide both a method and apparatus for measuring color deviation which are capable of detecting simultaneously deviations in several color components. It is a further object of this invention to provide a method and apparatus of the type described which are capable of detecting changes in the greying of a substance simultaneously with the detection of deviations in several color components. Another object of this invention is to provide a method and an apparatus of the type described which are unaffected by changes in light source intensity. Yet another object is to provide a method and an apparatus of the type described which are capable of use with continuous flow processes. A still further object is to provide a method and apparatus of the type described which provide a readily usable output signal. It is also an object of my invention to provide an apparatus of the type described which is capable of simple calibration. Another object is to provide an apparatus of the type described which is easily maintained and which is simple and rugged in construction. Other objects of the invention will in part be obvious and will in part appear hereinafter.

The invention accordingly comprises the several steps and the relation of one or more of such steps with respect to each of the others, and the apparatus embodying the features of construction, combination of elements and arrangement of parts which are adapted to effect such steps, all as exemplified in the following detailed disclosure, and the scope of the invention will be indicated in the claims.

Figure 2:
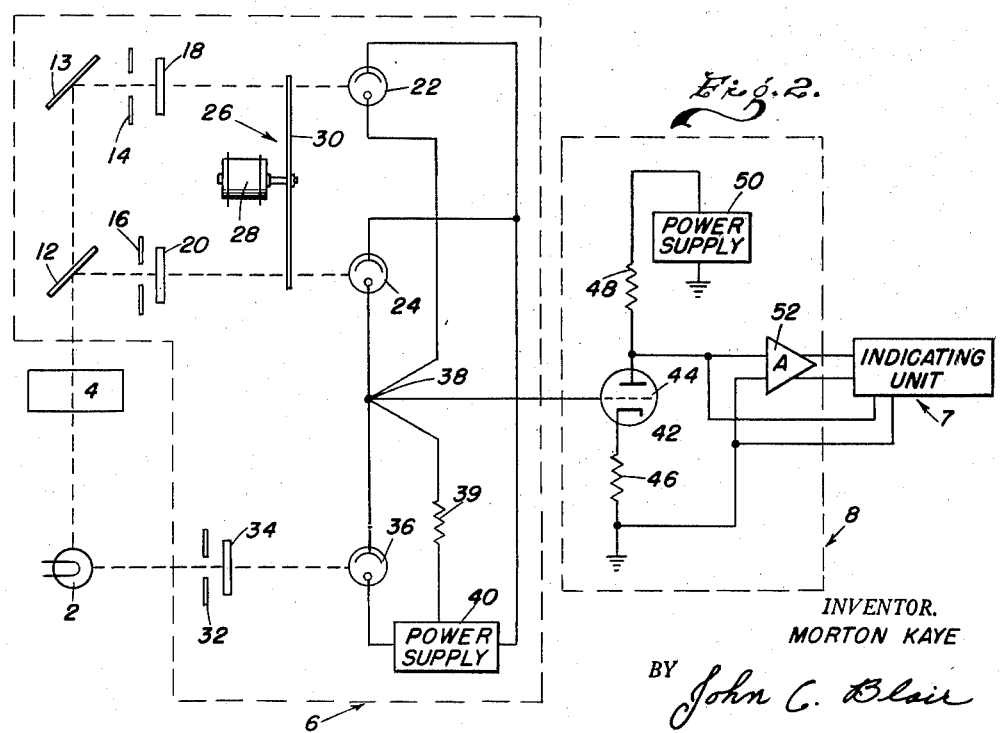

For a fuller understanding of the nature and objects of the invention, reference should be had to the following detailed description taken in connection with the accompanying drawings, in which:

Figure 1 is a pictorial diagram showing a typical installation of a color deviation measuring system, Figure 2 is a diagrammatic illustration of a color deviation detection system made according to my invention, Figure 3 is a schematic illustration showing the relationship of one form of light beam chopper to the phototubes of the detection system, Figure 4 is a schematic illustration similar to Figure 3 showing another form of light beam chopper, Figure 5 comprises graphs depicting the response of one embodiment of the color deviation measuring apparatus, and Figure 6 comprises graphs depicting the response of another embodiment of the color deviation measuring apparatus.

In general my invention operates to provide a plurality of light beams colored by the sample under test, each of these beams being filtered to pass one of the color components of interest. The respective intensities of the colored light beams are then compared in rotation with the intensity of an uncolored beam emanating directly from the light source, and since they are compared with the same thing they are in effect compared with each other. The result of this comparison is compared with the result obtained from similarly testing a standard sample. As a deviation in the greying of the substance under test will affect equally the intensities of all the colored light beams, such a deviation can be differentiated from deviations in individual color components.

The expressions "light" and "light source" as used throughout the specification and claims hereof are intended to include the infra-red and ultraviolet portions of the spectrum.

In Figure 1, there is shown a typical installation of apparatus to measure the color deviation of a continuously moving fluid. A light beam from a light source 2 in housing 3 is passed through a fluid contained in sample cell 4, said fluid being conveyed through the cell by means of pipes 5. The light colored by the sample is split into a plurality of light beams which are filtered and compared in the sensing unit, indicated generally at 6. The output of sensing unit 6 is displayed, in an appropriate manner by the indicating unit generally indicated at 7, after being amplified by amplifying unit 8 of Figure 2 which is contained in the same housing as indicating unit 7. Conduits 9, 11 and 10 carry cables supplying electrical power from indicating unit 7 to light source 2 and sensing unit 6 respectively. Conduits 9 and 10 also hold cables carrying the output of the sensing units 6 to the amplifying unit 8.

Figure 2 illustrates one embodiment of sensing unit 6 which contains a light splitting device consisting of half-silvered mirror 12 and fully-silvered mirror 13, arranged so that the light colored by the sample impinges first on half-silvered mirror 12 which reflects a portion thereof and transmits the remainder to mirror 13. The light beams, indicated by the dotted lines, are formed by the light reflected from the mirrors 12 and 13.

Sensing unit 6 also preferably contains adjustable slits 14 and 16, to adjust the respective intensities of the beams passing therethrough, although such slits are not always required, and filters 18 and 20, respectively, which pass the color components of interest in the measurement. The colored light beams are then intercepted by phototubes 22 and 24 respectively, or other suitable radiation sensitive electrical elements.

In my copending application filed December 13, 1955, Serial No. 555,930, entitled "Improved Sensing Unit for Color Deviation Measuring Instrument," I have disclosed readily interchangeable light separator filter units containing the aforementioned mirrors, filters and adjustable slits which greatly facilitate changeover from the examination of samples of one color to those of another desired color. The units are pre-calibrated for measurement of deviations in the various colors of interest. Thus, when there is a change in the desired color, the unit in place is readily extracted and replaced by another already calibrated to the new color, thereby minimizing lost production time.

A chopper generally indicated at 26 is situated in the path of the colored light beams to alternately interrupt each of them. As shown in Figure 2, chopper 26 is a conventional optical chopper having an electric motor 28 having affixed to its shaft a semicircular chopping disk 30. As best seen in Figure 3, the relationship of phototubes 22 and 24 to semicircular disk 30 is such that one colored light beam is passed to its associated phototube during one half of each rotation of disk 30, and the other light beam is similarly passed during the other half of such rotation. Other suitable optical means may, of course, be used to accomplish the beam splitting and chopping functions, e. g. rotating mirrors or de-centered lenses. Moreover, chopping need not be accomplished optically in the manner shown in Figure 2, but rather may be done electrically as by alternately energizing tubes 22 and 24, using a conventional high speed switch for such purpose.

An adjustable slit 32 and filter 34 either or both of which may be omitted in certain applications, are disposed in the path of a light beam emanating directly from light source 2. This beam is intercepted by phototube 36, which is connected in series with the parallel combination of tubes 22 and 24. Thus the output of tube 36 resulting from a deviation in intensity of the light beam falling thereon opposes the outputs of tubes 22 and 24, resulting from similar changes in the intensities of the beams falling thereon, and comparison of the respective intensities of the chopped and unchopped signals is accomplished at junction 38. The necessary anode voltages for the phototubes and the desired quiescent voltage at junction 38 are maintained by resistor 39 and sensing unit power supply 40 of conventional design. In certain applications it may be desirable to color all the light beams, perhaps passing one of them through a broad-band filter before intercepting it with a radiation sensitive element.

The output of sensing unit 6 is taken from point 38 and is direct-coupled to the first stage 42 of the amplifying unit generally indicated at 8. Stage 42 comprises vacuum tube 44 connected in a conventional circuit with a cathode resistor 46 in turn connected to ground; plate load resistor 48 is connected to plate power supply 50. From this stage, the direct component of the output is fed directly to indicating unit 7; the alternating component is amplified in amplifier 52, whose pass band is such as to round off the essentially square wave output of the sensing unit to substantially sine waves. The output of amplifier 52 is also fed to indicating unit 7.

Indicating unit 7 may contain any of the conventional display devices such as meters, oscilloscopes, recording instruments and the like; it may also contain control devices to effect changes in the product under test in accordance with the indications received from sensing unit 6.

To calibrate the instrument, a standard sample is placed in sample cell 4. Slits 14 and 16 are adjusted so that the output displayed by indicator 7 contains no alternating component. Finally, slit 32 controlling the intensity of the uncolored light beam from the light source is adjusted to bring the direct component of output voltage to a predetermined level, such as two volts. The output waveform then corresponds to the graph of Figure 5a. Since balance has been obtained between the three electrical signals generated by the light beams, the signals now register with equal amplitude at junction 38. The standard sample in cell 4 is then replaced by the substance to be tested. The calibration can, of course, be accomplished manually or electrically, e. g. by recording the readings obtained from the standard and subtracting them manually or electrically from those obtained from the sample under test.

If the material under test exhibits the same light transmission (or reflection) characteristics as those of the standard sample, the output will, of course, be the same as that obtained with the standard, and will correspond to the graph of Figure 5a. However, if there is a deviation in color, there will be a change in the relative intensities of the colored light beams and they will no longer register with equal intensity at point 38. For example, if the concentration of the color component conveyed by the light beam falling on tube 22 should increase, current through tube 22 will also increase as a result of the higher conductivity thereof. This occurs during the portion of the chopper cycle when tube 22 is illuminated by the light beam, thus increasing the voltage at the junction 38 during this period. During the half cycle in which tube 24 is illuminated, the voltage at the junction will remain at the level obtained with the standard. The resulting display by the indicating unit 7 is shown graphically in Figure 5b. If the color component to which tube 24 is sensitive rather than that to which tube 22 is sensitive increases in intensity, the waveform at the indicator will be the same, but reversed in phase and a phase sensitive circuit in the indicator unit may be used to indicate this.

If there is greying of the material or dilution by a clear substance, the intensities of the light beams associated with tubes 22 and 24 remain equal to each other but change relative to the intensity of the uncolored light beam. In such a case, the voltage at junction 38 will not vary from one half cycle of the chopper to the next, and thus will exhibit no alternating component; however, the direct voltage level will differ from that obtained with the standard sample.

A combination of greying or dilution and deviation in a color component will result in the sum of the indications obtained from the two conditions discussed above: there will be both an alternating component and a change in direct voltage level in the output. Such a condition is illustrated by the graph of Figure 5c. A change in light source intensity will not affect the readings, as there will be corresponding changes in the intensities of all three light beams, which will effectively cancel at junction 38.

In certain applications it may be desirable to measure the deviation of more than two color components. A second half-silvered mirror may be added to the light splitting device to form a third colored light beam which would then be passed through an adjustable slit and filter to a fourth phototube. In this construction, the chopper disk would have an open sector of 120° so as to pass each of the signals during one third of the chopper cycle. Again the chopper might be electrical if desired, energizing in rotation three (or more) phototubes.

In another embodiment of the color deviation measuring instrument, illustrated in Figure 4, the uncolored light beam is interrupted together with the colored light beams by chopping disk 54 of Figure 4. As disk 54 rotates, it passes filtered light beams alternately to phototubes 22 and 24 for one quarter cycle of each rotation, illuminating one tube every second quarter cycle. The uncolored light beam is passed to tube 36 during every period in which a colored light beam is passed. Again the chopper may operate in the electrical rather than the optical portion of sensing unit 6 by means of a combination of electrical switching devices.

Calibration is accomplished with a standard sample in cell 4, as in the first embodiment, by adjusting slits 14, 16 and 32 to obtain a non-alternating output such as that pictured in Figure 6a. The intensities of the signals generated by the light beams are equalized at junction 38 so that the output of phototube 36 alternately cancels the outputs of tubes 22 and 24. The voltage at junction 38 remains at its quiescent value set by power supply 40, determined as of the time all of the signals are interrupted.

If the material under test exhibits characteristics similar to those of the standard, there will again be no alternating component in the output, and the waveform shown in Figure 6a will be obtained. If there is a variation in the intensity of one color component, there will be an unbalance at junction 38 once during each cycle, resulting in an alternating waveform similar to that shown in Figure 6b, whose frequency is equal to the rotational rate of the chopper 26. Greying or dilution by a clear substance will cause unbalance twice during each cycle, resulting in an alternating waveform such as that of Figure 6c, whose frequency is twice the rotational rate of the chopper. Finally, where both of these conditions occur simultaneously, the unbalance will occur twice during each cycle but will alternate between two different magnitudes, with the resultant output illustrated by Figure 6d. These various waveforms can be separated by the indicator by using conventional filter techniques to indicate the various conditions. An inherent advantage in this embodiment of my invention is the elimination of the requirement for a direct coupled amplification stage, as all the necessary information can be handled by conventional alternating current amplifiers.

The sensing unit can, of course, be modified to accommodate additional colored light beams by modifying the chopper disk and adding additional half-silvered mirrors, adjustable slits, filters and phototubes.

Thus I have provided a color deviation measuring method and apparatus which are capable of simultaneous detection of deviations in several color components. A plurality of light beams are formed from a single beam colored by transmission through or reflection from a sample under test. Each of the colored beams is filtered to pass an appropriate color component, and then its intensity is compared electrically in turn with the intensity of an uncolored light beam from the same light source. The result of the comparisons is then checked electrically with the result obtained from examination of a standard sample.

An inherent advantage in my system is its ability to differentiate a change in the concentration of a color component from greying or dilution by a clear substance, since when the latter condition occurs, the intensities of all the colored light beams are equally affected, giving rise to a different output signal from that which obtains when but one color component changes. Also, since a change in light source intensity will affect equally the colored and uncolored light beams, leaving their relative intensities unaffected, such a change will not result in a different comparison, and thus will not register in the output of the system. Moreover, since the various sample conditions result in different output waveforms, rather than mere differences in level, they are readily distinguishable by simple conventional electric circuits.

In commercial applications my invention is particularly useful in continuous flow processes to monitor the color deviations of the product. Also, as is obvious from the above description, the apparatus is readily calibrated, and because it is simple in construction, it is easily maintained.

It will thus be seen that the objects set forth above, among those made apparent from the preceding description, are efficiently attained, and, since certain changes may be made in carrying out the above process and in the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. A color deviation measuring instrument for measuring deviations in color of a sample from a standard, comprising in combination, a light source, means for obtaining a plurality of light beams from said source colored by said sample, means for obtaining an uncolored light beam from said source, light filters associated with at least one of said light beams, each of said filters having a different transmission characteristic, a chopper to transmit in turn each of said colored light beams, and means for comparing the intensity of said colored light beams after chopping and filtering with the intensity of said uncolored light beam, to thereby indicate both deviation in color and greying or dilution of said sample with respect to said standard.

2. A color deviation measuring instrument for measuring deviations in color of a sample from a standard comprising in combination, a light source, means for obtaining a plurality of light beams from said source colored by said sample, means for obtaining an uncolored light beam from said source, means for adjusting the intensity of at least one of said light beams, light filters associated with said colored beams through which said colored light beams are passed, each of said filters having a different transmission characteristic, a chopper to transmit in turn each of said colored light beams, and means for comparing the intensity of each of said colored and filtered light beams after chopping with the intensity of said uncolored light beam, to thereby indicate both deviations in color and greying of said sample with respect to said standard.

3. A color deviation measuring instrument for measuring deviations in color of a sample from a standard comprising in combination, a light source, means for obtaining a plurality of light beams from said source colored by said sample, means for obtaining an uncolored light beam from said light source, light filters associated with said colored light beams through which said colored light beams are passed, each of said filters having a different transmission characteristic, means for comparing in rotation the intensities of said filtered colored light beams with the intensity of said uncolored light beam, an amplifying means to amplify the output of said comparing means, and an indicating means to display the output of said amplifying unit, to thereby indicate both the deviation in color and greying or dilution of said sample with respect to said standard.

4. The color deviation measuring instrument defined in claim 5 in which said amplifying means is adapted to provide both direct current and alternating current amplification.

5. A color deviation measuring instrument for measuring deviations in color of a sample from a standard comprising in combination, a light source, means for obtaining a plurality of light beams from said source colored by said sample, means for obtaining an uncolored light beam from said source, light filters associated with said colored light beams through which said colored light beams are passed, each of said filters having a different transmission characteristic, a chopper to transmit in turn each of said colored light beams and a plurality of radiation sensitive electrical elements, each of said elements intercepting one of said light beams, said electrical elements being so interconnected that the output of said elements which intercept said filtered and chopped colored light beams are in opposition to the output of said element which intercepts said uncolored light beam, to thereby indicate both deviations in color and greying or dilution of said sample with respect to said standard.

6. A color deviation measuring instrument for measuring deviations in color of a sample from a standard comprising in combination, a light source, means for obtaining a plurality of light beams from said source colored by said sample, means for obtaining an uncolored light beam from said source, light filters associated with said colored light beams through which said colored light beams are passed, each of said filters having a different transmission characteristic, a chopper having a chopping disk adapted to alternately transmit and interrupt said uncolored light beam and transmit in turn each of said colored light beams, and means for comparing the intensity of each of said colored and filtered light beams after chopping with the intensity of said uncolored light beam, to thereby indicate both deviations in color and greying or dilution of said sample with respect to said standard.

7. A color deviation measuring instrument for measuring deviations in color of a sample from a standard comprising in combination, a light source, a light beam separator providing a plurality of light beams from said source colored by said sample, means for obtaining an uncolored light beam from said light source, adjustable slits for adjusting the intensity of at least one of said light beams, light filters associated with each of said colored light beams, each of said filters having a different transmission characteristic, through which said colored light beams are passed, a chopper comprising a motor-driven rotating disk, said disk being located in the paths of said colored light beams and notched so as to transmit in turn each of said colored light beams, and means for comparing the intensity of each of said colored and filtered light beams after chopping with the intensity of said uncolored light beam to thereby indicate both deviations in color and greying or dilution of said sample with respect to said standard.

8. A color deviation measuring instrument for measuring deviations in color of a sample from a standard comprising in combination, a light source, means for obtaining a plurality of light beams from said source colored by said sample, means for obtaining an uncolored light beam from said light source, light filters associated with said colored light beams through which said colored light beams are passed, each of said filters having a different transmission characteristic, a plurality of radiation sensitive electrical elements to intercept each of said light beams, said elements being so interconnected that they form with said light beams a plurality of signal paths the output of said element intercepting said uncolored light beam being in opposition to the output of said elements intercepting said colored light beams, and means for interrupting in turn each of the signal paths of said colored light beams, to thereby indicate both deviation in color and greying or dilution of said sample with respect to said standard.

9. A color deviation measuring instrument for measuring deviations in color of a sample from a standard comprising in combination, a light source, a cell containing said sample so located as to color a light beam emanating from said light source, a light splitting device to split said light beam colored by said sample into a plurality of colored light beams, said light splitting device including a half-silvered mirror located in the path of said colored light beam from said sample so as to reflect a portion of said light beam and transmit the remainder thereof, and a fully-silvered mirror located in the path of the beam transmitted by said half-silvered mirror, said mirrors so positioned in relation to each other that the light beams reflected therefrom are parallel to each other, a chopper consisting of a motor-driven rotating semicircular disk, said chopper located in the paths of said colored light beams so that said colored beams fall on said disk at points diametrically opposed from each other, means for obtaining an uncolored light beam from said light source, adjustable slits for adjusting the intensity of each of said light beams, light filters associated with each of said light beams through which said light beams are passed, radiation sensitive electrical elements to intercept each of said light beams, said elements being so interconnected that the output of said element which intercepts said uncolored light beam is in opposition to the outputs of said elements which intercept said colored light beams, a direct current amplifier and an alternating current amplifier for amplifying the combined output of the said radiation sensitive electrical elements, and an indicating unit to display the outputs of said amplifiers to thereby indicate both deviations in color and greying or dilution of said sample with respect to said standard.

10. A color deviation measuring instrument for measuring deviations in color of a sample from a standard comprising, in combination, a light source, said sample located to color a light beam emanating from said light source, a light splitting device to split said light beam colored by said sample into a plurality of colored light beams, chopping means located in the paths of said colored light beams and arranged to pass in rotation each of said colored light beams, means for adjusting the intensity of at least one of said light beams, light filters associated with each of said light beams through which said light beams are passed, each of said filters having a different transmission characteristic, means for obtaining an uncolored light beam from said light source, radiation sensitive electrical elements disposed to intercept each of said light beams, said elements being so interconnected that the output of said element which intercepts said uncolored light beam is in opposition to the outputs of said elements which intercept said colored light beams, amplifying means for amplifying the combined output of said radiation sensitive electrical elements, said amplifying means being adapted to provide both direct current and alternating current amplification, and an indicating unit to display the outputs of said amplifiers to indicate thereby both deviations in color and greying or dilution of said sample with respect to said standard.

References Cited in the file of this patent

UNITED STATES PATENTS

| 2,395,489 | Major et al. | Feb. 26, 1946 |
| 2,462,995 | Ritzmann | Mar. 1, 1949 |
| 2,737,591 | Wright et al. | Mar. 6, 1956 |

FOREIGN PATENTS

| 1,024,076 | France | Jan. 7, 1953 |